United States Patent [19]
Moore

[11] 3,840,257
[45] Oct. 8, 1974

[54] SEALED CONNECTOR
[75] Inventor: Donald B. Moore, Pontiac, Mich.
[73] Assignee: Locking Devices Corporation, Pontiac, Mich.
[22] Filed: Apr. 24, 1972
[21] Appl. No.: 246,645

[52] U.S. Cl............ 285/334.3, 285/334.5, 285/353, 285/DIG. 11
[51] Int. Cl............................................. F16l 19/02
[58] Field of Search .... 277/DIG. 6; 285/249, 334.1, 285/334.2, 334.3, 334.5, 353, DIG. 11, 423

[56] References Cited
UNITED STATES PATENTS

| | | | |
|---|---|---|---|
| 857,956 | 6/1907 | Mueller | 285/334.5 X |
| 2,287,142 | 6/1942 | Simmonds | 285/334.3 |
| 2,420,778 | 5/1947 | Herold | 285/334.5 X |
| 2,430,657 | 11/1947 | Zolleis | 285/334.1 |
| 2,496,149 | 1/1950 | Cahenzli | 285/334.5 X |
| 2,695,425 | 11/1954 | Stott | 277/DIG. 6 |
| 3,503,632 | 3/1970 | Braun | 285/334.5 X |
| 3,650,550 | 3/1972 | West | 285/423 X |

Primary Examiner—Mervin Stein
Assistant Examiner—David H. Corbin
Attorney, Agent, or Firm—Whittemore, Hulbert & Belknap

[57] ABSTRACT

A sealed connector structure is provided for making a fluid-tight connection between a pair of conduits or to one end of one conduit. The connector structure employs a pair of threaded cup-shaped male and female members which define a chamber within which is located a flared end of at least one conduit, a rotatable compression ring on the conduit, and a sealing element between the flared end of the conduit and an adjacent surface of either the male or the female member. The members are threaded together to cause compression of the sealing element with resultant cold flow thereof to make sealing contact with adjacent surfaces of the components.

6 Claims, 6 Drawing Figures

SEALED CONNECTOR

BACKGROUND OF THE INVENTION

The present invention is particularly adaptable for use in connection with refrigeration circuitry. In refrigeration circuitry, refrigerant lines are normally connected together in fluid-tight relationship by means of soldering, welding or brazing. Frequently, in the field, it is not possible to satisfactorily employ these processes. Either it is technically impossible under field conditions to use one or more of these sealing techniques or use of such techniques is expensive, requiring complicated equipment and highly skilled labor. Additionally, there are many instances in a factory where it would be desirable to employ other less complicated techniques for connecting together refrigerant lines.

One particular problem in connection with connection in the field of refrigerant lines has been the joining together of aluminum conduits. Aluminum conduits may satisfactorily be welded in the factory under highly controlled conditions. However, aluminum is so difficult to weld that it has not heretofore been possible as a practical matter to use aluminum extensively in refrigeration circuitry. The use of aluminum is desirable because of its low cost, ready availability and light weight.

The present invention avoids the need for soldering, welding or brazing by providing a mechanical seal which is capable of withstanding the high temperatures, high pressures and corrosive action of refrigerants while still providing a fluid-tight seal.

SUMMARY OF THE INVENTION

A sealed connector structure is provided for fluid-tight connection to the end of at least one conduit. The structure includes an externally threaded cup-shaped male member and an internally threaded cup-shaped female member which is threadingly received on the male member and defines a chamber therewith. At least one of the members has axial opening means therethrough leading into the chamber. A conduit extends through the opening means of said one member into the chamber. The inner end of said conduit is flared radially outwardly. A compression ring is rotatably received on the conduit within said chamber between said flared inner end and at adjacent surface of said one member. The compression ring has an angled end surface which abuts one side of the flared inner end of the conduit. A sealing element is provided within the chamber between the flared inner end of the conduit and an adjacent surface of the other of the members. The sealing element comprises an outer sleeve fabricated of an elastomeric, relatively stiff polymeric material capable of withstanding relatively high temperatures. The outer sleeve has an angled end surface abutting the other side of the flared inner end of the conduit. An inner metallic sleeve is provided within the outer sleeve. The male and female members are threaded together sufficiently to compress the outer sleeve and cause cold flow thereof into sealing contact with adjacent surfaces of the male member, the other side of the flared inner end of the conduit and the inner sleeve of the sealing element.

IN THE DRAWINGS

Figure 1:
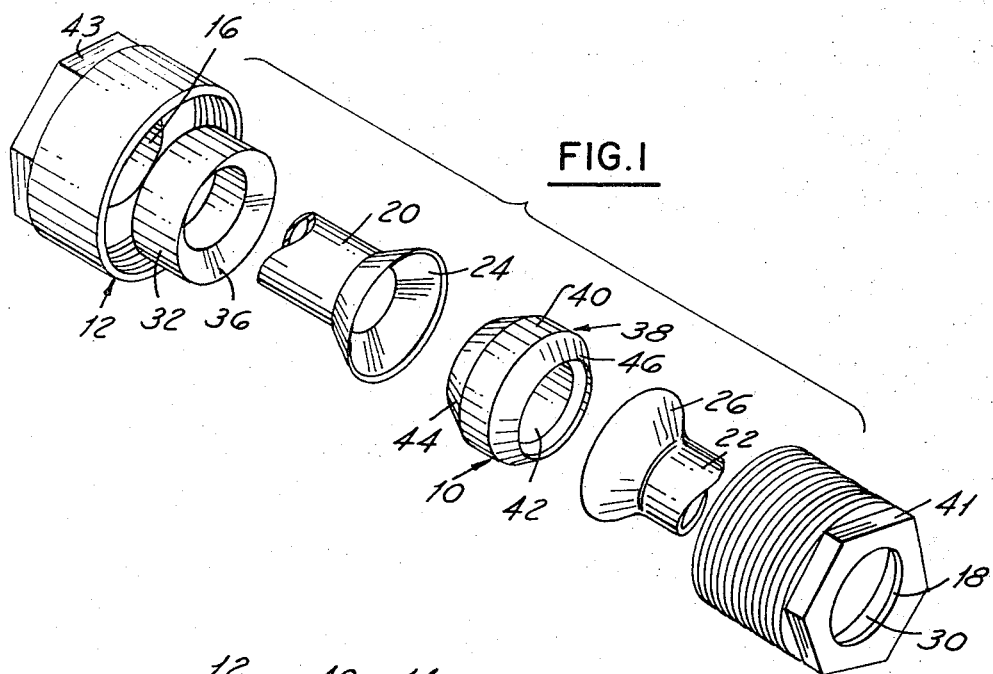
FIG. 1 is an exploded view in perspective of one embodiment of the sealed connector of the present invention.
Figure 2:
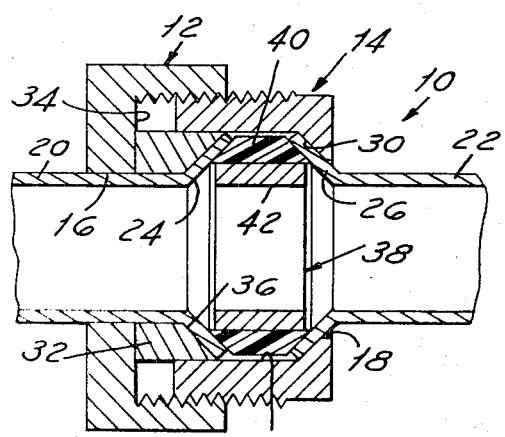
FIG. 2 is a view in cross-section of the sealed connector of FIG. 1 assembled but prior to tightening of the unit to cause sealing action.
Figure 3:
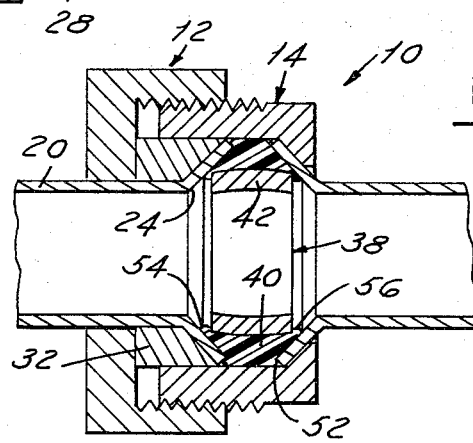
FIG. 3 is a view in cross-section similar to FIG. 2 subsequent to tightening of the unit to cause the sealing action.

Referring to the embodiment illustrated in FIGS. 1–3, the sealed connector 10 comprises cup-shaped internally and externally threaded female and male members 12, 14 which, when secured together, define a chamber. An opening 16, 18 is provided in each of the members 12, 14 for the passage therethrough of tubular conduits 20, 22. The inner ends 24, 26 of conduits 20, 22 are radially outwardly flared at an angle illustratively of 45°. The flared ends 24, 26 are received within the male member 14 when the parts are assembled with the straight tubular portions extending through openings 16, 18.

The interior of the male member 14 comprises a cylindrical surface 28 extending from the inner end thereof towards the opening 18. A radially inwardly extending conical surface 30 defines a lip for engagement of the flared end 26 of conduit 22. The angle of the surface 30 substantially matches the angle of the flared end 26. A compression ring 32 is provided in conduit 22 between the flared end 24 and the surface 34 of the female member 12. The inner end surface 36 of ring 32 is angled to substantially match the angle of the flared end 24 of conduit 20.

A sealing element 38 is provided within male member 14 between the flared ends 24, 26 of conduits 20, 22. The sealing element 38 comprises an outer elastomeric polymeric sleeve 40 and an inner hollow cylindrical sleeve 42. The inner sleeve 42 is preferably fabricated of a relatively soft metal such as aluminum. It will be noted that the outer end surfaces 44, 46 of the elastomeric sleeve 40 are angled to match the flare of the conduit ends 24, 26. The sleeve 40 is slightly longer than the sleeve 42 whereby the ends extend slightly therebeyond. It will be noted also that the outer diameter of sleeve 40 is slightly less than the inner diameter of the cylindrical portion 28 of the male member 14.

The elastomeric sleeve 40 is fabricated of a polymeric material which is relatively stiff so as to resist deformation but which permits sufficient deformation for sealing purposes. Resistance to deformation is important in respect to the ability of the connector to withstand relatively high fluid pressures which may be impinged thereupon during use of the sealed connector. It is also important that the material be resistant to high temperatures which may be encountered in use, particularly in refrigeration applications, when temperatures may be normally in the range of 200° to 300° F. and rise to the level of 480° F. Not only should the material resist degradation at these temperatures but also it should be dimensionally stable so as to maintain the seal.

One material which has been found to be satisfactory is sold under the trademark "Nylatron" by the Polymer Corporation of Reading, Pennsylvania. This material is nylon filled with finely divided particles of molybdenum disulphide. This material has high wear resistance, high strength and stiffness, high heat resistance and good dimensional stability. The properties of this material are given as follows:

| Property | Units | ASTM Method | NYLATRON GS |
| --- | --- | --- | --- |
| Tensile Strength 73°F. | psi | D638 | 10,000–14,000 |
| Modulus of Elasticity 73°F. | psi | D638 | 450,000–600,000 |
| Flexural Strength 73°F. | psi | D790 | 16,000–19,000 |
| Tensile Impact | ft. lb./sq. in. | | |
| Heat Deflection temp.— | | | |
| 66 psi | °F. | D648 | 400–490°F. |
| 264 psi | °F. | D648 | 200–470°F. |
| Deformation Under Load | | | |
| 122°F., 2000 psi | % | D621 | 0.5–2.5 |
| Coefficient of Linear Thermal Expansion | in./in./°F. | D696 | $3.5 \times 10^{-5}$ |
| Dielectric Strength (Short Time) | V/mil. | D149 | 300–400 |
| Water Absorption— Immersion 24 hrs. | % | D570 | 0.5–1.4 |
| Color | | | gray to black metallic |

Referring now specifically to FIGS. 2 and 3, once the parts have been assembled together as shown in FIG. 2, the male member 14 is held against rotation by means of wrench engageable head 41 while the female member 12 is threaded thereon by means of wrench engageable head 43. As the female member is threaded onto the male member, the compression ring 32 is forced to the right as seen in FIGS. 2 and 3 thereby causing the flared ends 24, 26 of the conduits to press against the elastomeric polymeric sleeve 40. This results in some deformation of the sleeve 40 causing it, as shown in FIG. 3, to bulge radially outwardly at 52 and axially as at 54, 56. The amount of the deformation is relatively small. However, it is sufficient for the purposes of the seal which are to cause cold flow into any surface irregularities such as nicks, scratches, out-of-roundness, and variation in thickness of the flared ends 24, 26 of the conduits and the inner surface of the male member 14.

It will be noted that during putting together of the male and female members, the fact that the male member 14 is maintained against rotation prevents scoring of the conduit end 26 by the male member and prevents the conduit end 26 from scoring the sleeve 40 thus avoiding possible damage thereto resulting in an imperfect seal. The compression ring 32 is not rotated significantly by the rotating female member 12 because there is a slip fit therebetween. As soon as sufficient pressure has built up against the flared end 24, the compression ring 32 ceases to have any rotation thus preventing scoring as above described. The net result is an adequate seal at relatively high pressures and temperatures. The unit may be dissembled and re-sealed as desired with satisfactory repeating of the sealing action.

The use of an inner sleeve 42 within the elastomeric sleeve 40 is of particular importance in effectuating the desired seal. As will be noted in FIG. 3, there is a slight deformation of the sleeve 42 after the connector 10 has been threaded together to effectuate the seal. This deformation occurs because of the use of a soft metal, such as aluminum, in the fabrication of the sleeve 42. The sleeve 42 functions as a camming surface which cooperates with the surfaces 30, 36 of male member 14 and compression ring 32 to cause pressure to be applied to the elastomeric sleeve 40 to result in the deformation thereof desired to cause this member to cold flow into sealing engagement with the aforementioned surfaces.

Figure 4:
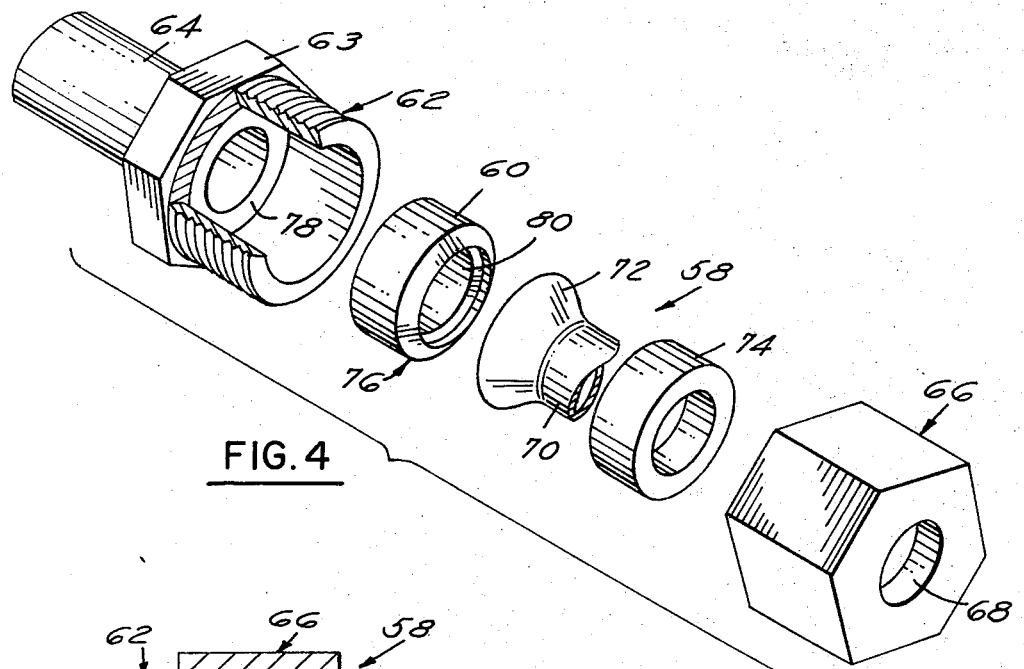
FIG. 4 is an exploded view in perspective of another embodiment of the present invention.
Figure 5:
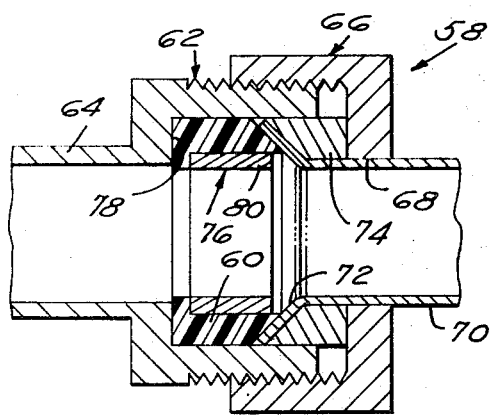
FIG. 5 is a view in cross-section of the sealed connector of FIG. 4 illustrating the connector assembled but prior to tightening thereof to cause sealing action.
Figure 6:
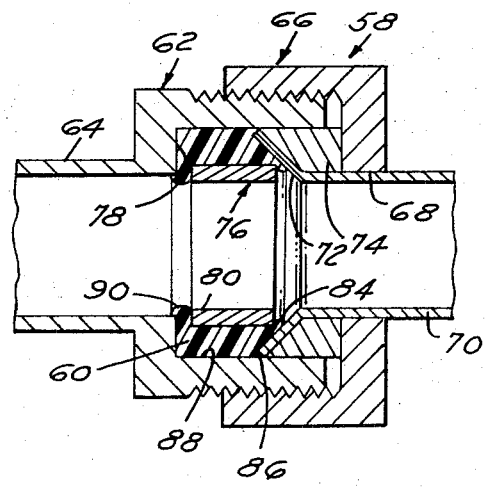
FIG. 6 is a view in cross-section similar to FIG. 5 subsequent to tightening of the unit to cause sealing thereof.

FIGS. 4–6 illustrate a modified version of a sealed connector 58. In this embodiment, sealing is effectuated at one end only of an elastomeric sealing sleeve 60 as opposed to the double-ended seal obtained in the FIGS. 1–3 embodiment.

The sealed connector 58 comprises a cup-shaped externally threaded male element 62 which has integrated therewith a nut 63 and conduit structure 64. An internally threaded cup-shaped female element 66 is provided to engage the element 62 and define therewith a chamber. The element 66 has an opening 68 for reception of conduit 70 having a flared inner end 72 as previously described. A compression ring 74 is received on conduit 70. The ring 74 has a construction as previously described in connection with ring 32.

A sealing element 76 is provided for juxtaposition between the flared end 72 and the surface 78 of the male member. The sealing element 76 comprises the elastomeric sleeve 60 having an inner sleeve 80 received in a recess formed therewithin.

FIG. 5 illustrates the elements of the connector assembled together prior to tightening of the male and female elements to cause deformation of the sleeve 60. After the elements have been threaded together, the sleeve 60 cold flows at 84, 86 (FIG. 6) to result in a seal between the flared end 72 and inner surface 88 of the male element. Cold flow also takes place at 90. However, a fluid-tight seal is not necessarily developed at this point.

The seal provided by connector 58 is satisfactory for many applications. However, the assembly requires a special male element 62 whereas the FIGS. 1–3 embodiment permits joining of the free ends of a pair of abutting conduits without the conduits themselves being of any special structure. In practice, the flared ends of the conduits are formed on standard tubing by means of a simple flaring tool. Thus, the workmen in the field can make a connection as desired between conduits of the same or dissimilar metals and between conduits, such as aluminum, which are extremely difficult to weld together in sealed tight relationship.

What I claim as my invention is:

1. A sealed connector structure for fluid-tight connection to the end of at least one conduit in a refrigeration circuit comprising an externally threaded, cup-shaped male member, an internally threaded, cup-shaped female member threadingly received thereon and defining a chamber therewith, at least one of said members having axial opening means therethrough leading into said chamber, a conduit extending through the opening means of said one member into the chamber, the inner end of said conduit being flared radially outwardly, a compression ring rotatably received on said conduit within said chamber between said flared inner end and an adjacent surface of said one member, said compression ring having an angled end surface abutting one side of said flared inner end of the conduit, a sealing element within said chamber between said flared inner end of the conduit and an adjacent surface of the other of said members, said sealing element comprising an outer sleeve fabricated of an elastomeric, relatively stiff polymeric material capable of withstanding relatively high temperatures, said outer sleeve having an angled end surface abutting the other side of said flared inner end of the conduit, an inner metallic sleeve within said outer sleeve, said male and female members being threaded together sufficiently to compress said outer sleeve and cause cold-flow thereof into sealing contact with adjacent surfaces of the male member, said other side of the flared inner end of the conduit, and said inner sleeve, said outer sleeve extending axially slightly beyond said inner sleeve to define an unrestricted portion thereof for said cold flow.

2. A sealed connector structure as defined in claim 1, further characterized in that said inner sleeve is fabricated of a relatively soft metal.

3. A sealed connector structure as defined in claim 1, further characterized in that said outer sleeve is fabricated of nylon filled with finely divided particles of molybdenum disulphide.

4. A sealed connector structure for fluid-tight connection of the ends of a pair of conduits in a refrigeration circuit comprising an externally threaded, cup-shaped male member, an internally threaded, cup-shaped female member threadingly received thereon and defining a chamber therewith, said members having axial opening mean therethrough leading into said chamber, a separate conduit extending through the opening means of each of said members into the chamber, the inner end of each of said conduits being flared radially outwardly, a compression ring rotatably received on one of said conduits within said chamber between the flared inner end of the conduit and an adjacent surface of one of said members, said compression ring having an angled end surface abutting one side of the adjacent flared inner end, a sealing element within said chamber between the flared ends of said conduits, said sealing element comprising an outer sleeve fabricated of an elastomeric, relatively stiff polymeric material capable of withstanding relatively high temperatures, the ends of said outer sleeve being angled and abutting the adjacent surfaces of said flared inner ends of the conduits, an inner metallic sleeve within said outer sleeve, the other of said members having an angled surface abutting against the flared inner end of the other of said conduits, said male and female members being threaded together sufficiently to compress said outer sleeve and cause cold-flow thereof into sealing contact with adjacent surfaces of the male member, the flared ends of the conduits and said inner sleeve, said outer sleeve extending axially slightly beyond said inner sleeve to define an unrestricted portion thereof for said cold flow.

5. A sealed connector structure as defined in claim 4, further characterized in that said inner sleeve is fabricated of a relatively soft metal.

6. A sealed connector structure as defined in claim 4, further characterized in that said outer sleeve is fabricated of a nylon filled with finely divided particles of molybdenum disulphide.

* * * * *